No. 785,032. PATENTED MAR. 14, 1905.
O. F. BEYTHAN.
BEAN SEPARATING MACHINE.
APPLICATION FILED JUNE 1, 1903.

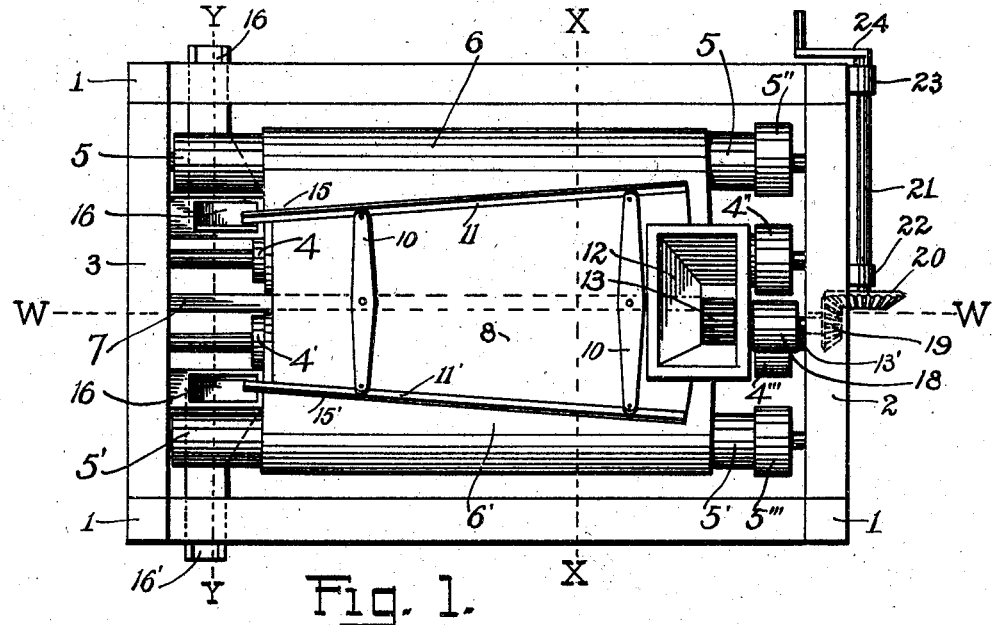

3 SHEETS—SHEET 3.

WITNESSES:

INVENTOR
Otto F. Beythan
BY
H. Pistorius
ATTORNEY

No. 785,032. Patented March 14, 1905.

UNITED STATES PATENT OFFICE.

OTTO F. BEYTHAN, OF FREELAND, MICHIGAN.

BEAN-SEPARATING MACHINE.

SPECIFICATION forming part of Letters Patent No. 785,032, dated March 14, 1905.

Application filed June 1, 1903. Serial No. 159,653.

*To all whom it may concern:*

Be it known that I, OTTO F. BEYTHAN, a citizen of the United States, residing at Freeland, in the county of Saginaw and State of Michigan, have invented new and useful Improvements in Bean-Separating Machines; and I do hereby declare that the following is a full, clear, and exact description of the same.

This invention relates to machines for separating the defective unsalable beans and refuse from the sound marketable beans or like products; and the object of my improvement is to separate the different qualities into marketable grades, so as to obtain the greatest value from a crop.

The accompanying drawings illustrate a construction by which the invention may be carried out, in which—

Figure 3:
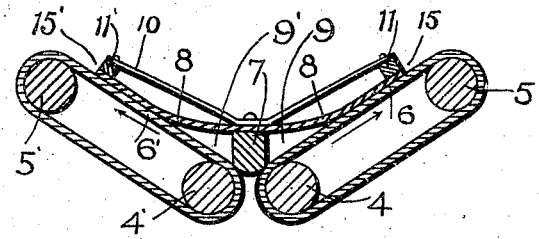
Figure 4:
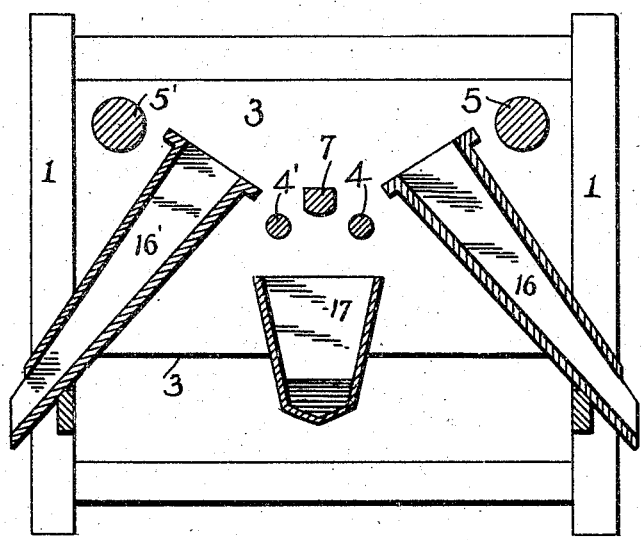
Figure 5:
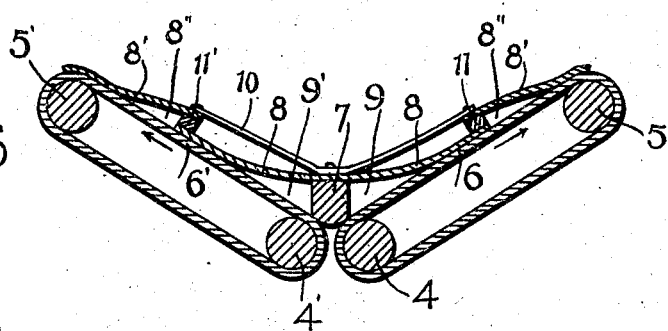
Figure 6:
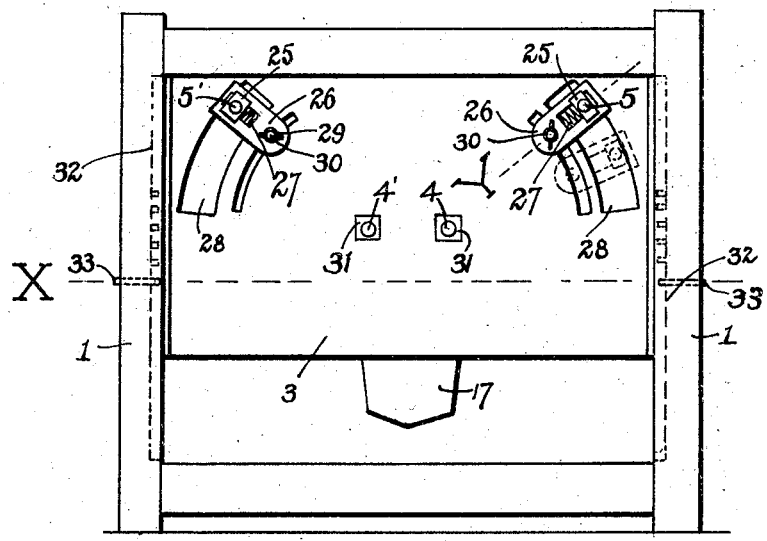
Figure 7:
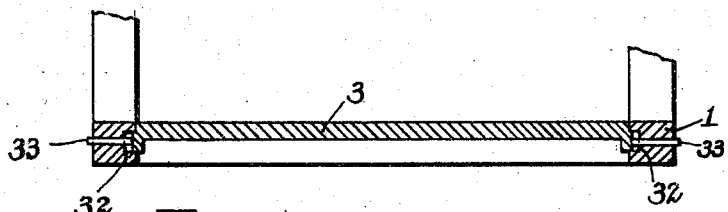
Figure 8:
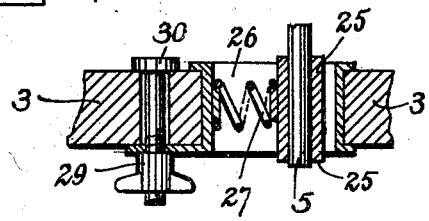

Figure 1 is a plan view. Fig. 2 is a sectional view on the line W W of Fig. 1. Fig. 3 is a sectional view on the line X X of Fig. 1. Fig. 4 is a sectional view on the line Y Y of Fig. 1. Fig. 5 is a sectional view showing a modified construction of the separating-belts and cover. Fig. 6 is a rear view showing the adjustable boxes. Fig. 7 is a section on the line X of Fig. 6. Fig. 8 is an enlarged section on the line Y of Fig. 6.

Similar numerals refer to similar parts throughout the several views.

The posts 1, with the front cross-bars 2 and the rear cross-bars 3, form the main frame of the mechanism. Running parallel to each other and inclined downwardly to the rear are the rollers 4 5 and 4' 5', carrying and driving the endless belts 6 and 6', respectively. The belts 6 and 6' are made of felt or material with a surface of villous or like texture. Rollers 4 and 4' are lower and between the rollers 5 and 5', so that, with the belts 6 and 6', they form an inclined trough lowest at the rear end, the belts running in opposite directions from the center toward the high sides of the trough, as shown by the arrows in Fig. 3. The rollers 4 5 and 4' 5' are journaled in adjustable boxes secured to the cross-bars 2 and 3 and are adapted to be moved so as to take up the slack and permit the angle of the inclination of the trough or its sides to be changed to any suitable angle.

The boxes 25 slide in carriages 26, (see Fig. 6,) which are suitably slotted, so that the springs 27 will bear against and force the boxes radially from the rollers 4 and 4'. These rollers are journaled in boxes 31, held stationary in the cross-bars 2 and 3. The springs 27 therefore act to take up the slack of belts 6 and 6'. The carriages 26 slide in circular slots 28, formed in the cross-bars 2 and 3, the journals 4 and 4' being the center points. By moving the carriages 26 up or down in the slot 28 the angle of the belts may be changed at will. By means of the thumb-nut 29 and bolt 30 the carriage 26 may be locked in position. The rear cross-bar 3 slides in the grooves 32 in the posts 1 of the frame, (see Fig. 7,) so that if the bar be raised or lowered the boxes 25 and 31 will be carried with it. The inclination of the belts to the rear may be thus set at a suitable angle. The cross-bar 3 may be locked in position by a pin 33, as shown, or any other ordinary means, as is obvious. The trough formed by the two belts is divided in the center by the bar 7, which is secured at each end to the cross-bars 2 and 3, and extends parallel with the rollers 4 and 4' and almost in contact with the endless belt, so as to prevent the loss of beans through the space between the rollers 4 and 4'.

To the top of the bar 7 and extending laterally therefrom is secured a stationary cover of felt 8 or like material, preferably tapering toward the rear, the outer or upper portions of which may lie upon and are preferably in contact with the moving belts 6 and 6', so as to leave wedge-shaped open spaces 9 and 9' at the side of the central bar 7. This cover or apron 8 may be held in proper contact with the moving bottoms 6 and 6' by flat springs 10, secured to the central bar 7, the outer ends of which are secured to and press upon the bars 11 and 11', to which the outer ends of the apron 8 are secured.

The beans are fed at a proper speed from the feed-hopper 12 by means of the fluted feed-wheel 13 into the spout 14, which discharges the beans into the triangular spaces 9 and 9', just described, and onto the moving belts 6 and 6', almost filling the spaces 9 and 9'. The movement of the belts toward the high side now causes the beans to rotate and be tumbled over and over in the spaces 9 and 9', which I find should be about the height of three beans at the large end in order to work well, and the under beans are constantly urged up into the narrow end of the spaces 9 and 9'. Here the inferior beans and dirt, having relatively rough surfaces, are caught between the fibrous or villous surfaces of the moving bottoms 6 and 6' and the stationary apron 8, between which they are rolled until they come out at the high side of the apron 8, whence they may run down the inclined troughs 15 and 15', formed by the junction of the bars 11 and 11' with the belts 6, and 6' and fall into spouts 16 and 16', by which they may be carried into any convenient receptacle. The sound beans have a comparatively smooth polished surface, and as fast as they are carried up, since the felt-like surfaces of the belts 6 and 6' have but little adhesion to them, almost all of them will roll down the inclined plane of the belt faster than the movement of the belt can carry them up, and if any are carried up against and touch the stationary cover or apron 8, being too slippery to be held between the felt-like or villous surfaces of the belt and apron, they will constantly drop back to the lowest part of the spaces 9 and 9'. As previously described, these spaces are inclined lengthwise and cause the beans to gradually work down along the bar 7 to the rear of the machine, where they drop into the hopper 17 and are discharged thence into any convenient receptacle.

The fluted feed-wheel 13 and the rollers 4, 5, 4', and 5' may be driven by any suitable power. One method is shown in Fig. 1. Mounted on the same shaft 13' with the feed-wheel 13 is a pulley 18 and a bevel gear-wheel 19, which meshes with a bevel-gear 20, mounted on one end of shaft 21, running in bearings 22 and 23, secured to the frame 1. On the other end of the shaft 21 is the crank 24, by which motion may be imparted to the mechanism.

4'', 5'', 4''', and 5''' are pulleys mounted on 4, 5, 4' and 5', respectively, and are connected by belts in any suitable manner to the pulley 18 on shaft 13'.

To clean the beans more perfectly, they may be run through the separating-belts a second time. During the first cleaning very often some good beans are drawn in with the poor beans and refuse. To overcome this and avoid running the refuse through the separating-belts a second time, I use the modified method of arranging the apron or cover 8 as shown in sectional view in Fig. 5, by means of which after the first separation the refuse is given another separation in order to extract all the sound beans from same. The same numerals of reference are used as in the previous description. Attached to the bars 11 and 11' are auxiliary covers 8', the outer portions of which being in contact with the moving belts and the portions near to the bars 11 and 11' being free from same, leaving the open longitudinal spaces 8'', which are almost duplicates of the spaces 9 and 9'. The operation is the same as above described until the dirt and poor beans reach the spaces 8''. Then instead of rolling into the receiving-spout 16 they are again tumbled over and over, as previously described, the poor beans being rolled out between the moving belt and stationary cover 8' and are dropped over the sides, while the good beans are retained in and roll out at the bottom end of the space 8, whence they may be dropped into any convenient receptacle.

It is obvious that a combination of any number of separating-belts may be arranged, so as to suit the handling of any size crop.

It will be plainly seen that one endless traveling belt will make just as operative a machine as the two diverging ones shown and described, the double construction merely being shown as the most economical.

Without limiting myself to the precise construction and arrangements of parts shown, as it is obvious that changes can be made therein without departing from the essential features of my invention, I claim as my invention—

1. In a device of the class described, an upwardly-moving inclined bottom of material having a villous surface; together with a stationary transversely-flexible apron arranged above said inclined bottom, said apron being disposed at an inclination relatively to said inclined bottom, the lower end of said apron being farther away from said bottom than the upper end.

2. In a device of the class described an upwardly-movable inclined bottom of fabric having a surface of villous texture; a fixed transversely-flexible apron of similar surface arranged above said movable bottom; said fixed apron having one end out of contact with the movable bottom and being so disposed that the distance between said apron and movable bottom gradually diminishes toward the high side of the inclined bottom, for the purposes set forth.

3. In a separating-machine of the class described the combination with an upwardly-moving inclined bottom having a villous upper surface; of a stationary transversely-flexible apron having a villous lower surface and arranged above and in proximity to said bottom, the lower end of said apron being out of contact with said bottom and being so disposed that the space between said apron and bottom gradually diminishes toward the high side of the inclined bottom, for the purpose set forth.

4. In a separating-machine the combination with an upwardly-moving inclined bottom having a villous surface; of a stationary transversely-flexible apron having a villous surface, the lower end of said apron being out of contact with said bottom and being so disposed relatively to said bottom that the space between the opposing villous surfaces of said apron and bottom gradually diminishes toward the high side of the inclined bottom, for the purposes set forth.

5. In a device of the class described two converging aprons arranged one above the other and having opposing surfaces of villous texture, the lower apron being endless and so arranged as to present a continuous upwardly-moving inclined surface; the upper apron being stationary and having one end out of contact with the lower apron and the other end yieldingly in contact with the lower apron, said upper apron being transversely flexible.

6. In a separating-machine, the inclined triangular-shaped separating-chamber, having an inclined traveling bottom of felt-like texture; a substantially vertical stationary side, and a substantially horizontal stationary top side of felt-like material yieldingly engaging the high end of the inclined moving bottom as and for the purposes set forth.

7. The substantially triangular separating-chambers 9 and 9' inclined toward the rear, the bottom side of said chamber being an inclined plane movable transversely toward the high side of the triangle; and having a feed-hopper discharging into the bottom angle of said separating-chambers at the high end of the same.

8. In a separating-machine of the class described, diverging endless traveling belts of felt, forming a trough inclined downwardly at the rear end, the movement of said belts being in the direction of the high side of the trough; in combination with a central longitudinal bar having a member of like material secured to and extending laterally therefrom, so that the outer portions are in yielding contact with the high side of said traveling belts, and the inner portions are held free from same so as to form substantially triangular separating-chambers, largest near the central bar and gradually diminishing and closing toward the high side of said belts.

9. In combination with a machine of the class described, the diverging endless belts of felt forming a trough inclined downwardly to the rear end; a central longitudinal bar in contact with the said belts along the bottom of said trough; a member of felt secured to said longitudinal bar and extending laterally therefrom so that the outer portions will engage the high side of said trough and thereby form the substantially triangular separating-chambers 9 and 9'; a spring secured to said central bar and to the lateral edges of said member of felt for the purpose of holding the same in proper yielding contact against the said moving belts; a feed-hopper with a spout discharging into the bottom of the high end of the said separating-chamber; and a receiving-spout at the lower end of said chamber for receiving the separated material.

10. In combination with a machine of the class described, the diverging endless belts of felt forming a trough inclined downwardly to the rear end; a central longitudinal bar in contact with the said belts along the bottom of said trough; a member of felt secured to said longitudinal bar and extending laterally therefrom so that the other portions will engage the high side of said trough and thereby form the substantially triangular separating-chambers 9 and 9'; and a spring secured to said central bar and to the lateral edges of said member of felt for the purpose of holding the same in proper yielding position against the said moving belts.

11. In combination in a machine of the class described, the diverging endless belts of felt forming a trough inclined downwardly to the rear end; a central longitudinal bar in contact with the said belts along the bottom of said trough; a member of felt secured to said longitudinal bar and extending laterally therefrom so that the outer portions will engage the high side of said trough and thereby form the substantially triangular separating-chambers 9 and 9'.

12. In a device of the class described, an upwardly-moving inclined bottom; together with a stationary transversely-flexible apron arranged above said inclined bottom, said apron being disposed at an inclination relatively to said inclined bottom, the lower end of said apron being farther away from said bottom than the upper end; the opposing surfaces of said aprons being of such nature as to exert slight tenacity for beans of smooth surface and greater tenacity for beans of rough or wrinkled surface, for the purpose specified.

13. In a device of the class described, an upwardly-traveling inclined bottom of fabric, an apron of flexible fabric supported along one edge above said traveling apron, the body portion of said non-traveling apron being adapted to rest loosely upon said traveling bottom, for the purposes set forth.

In testimony whereof I affix my signature in presence of two witnesses.

OTTO F. BEYTHAN.

Witnesses:
  HERMAN PISTORIUS,
  J. F. BECKBISSINGER.